United States Patent [19]

Watts

[11] 4,092,774

[45] June 6, 1978

[54] PLASTIC TUBE CUTTER

[76] Inventor: Homer Watts, 8725 Continental, Warren, Mich. 48089

[21] Appl. No.: 761,223

[22] Filed: Jan. 21, 1977

[51] Int. Cl.[2] .......................... B23D 21/06; B26B 27/00; B26D 3/16

[52] U.S. Cl. .......................... 30/92; 30/94; 30/112; 30/124; 30/134

[58] Field of Search .......................... 30/92, 93, 94, 95, 96, 30/112, 124, 134

[56] References Cited

U.S. PATENT DOCUMENTS

| | | | |
|---|---|---|---|
| 681,972 | 9/1901 | Postlethwait | 30/134 |
| 734,688 | 7/1903 | Farley et al. | 30/112 X |
| 964,182 | 7/1910 | Porter | 30/134 X |
| 1,294,404 | 2/1919 | Conley | 30/94 X |
| 1,632,004 | 6/1927 | Hampton | 30/92 X |
| 1,918,700 | 7/1933 | Harris | 30/134 X |
| 2,121,752 | 6/1938 | Williams | 30/92 |

FOREIGN PATENT DOCUMENTS

| | | | |
|---|---|---|---|
| 1,146,603 | 5/1957 | France | 30/124 |

*Primary Examiner*—James L. Jones, Jr.
*Assistant Examiner*—J. T. Zatarga
*Attorney, Agent, or Firm*—Gifford, Chandler, VanOphem, Sheridan & Sprinkle

[57] ABSTRACT

A cutting device particularly adapted for cutting plastic tubing is provided and includes a first and second elongated handle member. The handle members are pivotally secured together at one end so that the handle members are movable relative to each other between an open and closed position. Semicircular and facing recesses are formed along the inner side of the handle members which correspond in shape to the outer periphery of the plastic tubing which is to be cut. Thus, with the plastic tubing between the handle members the handle members are moved to their closed position which clampingly engages the plastic tubing between the semicircular recesses. A cutting blade is pivotally secured to one of the handle members so that the cutting blade can be moved across the handle members to cut the plastic tubing.

5 Claims, 5 Drawing Figures

PLASTIC TUBE CUTTER

BACKGROUND OF THE INVENTION

1. Field of the Invention

The present invention relates generally to tools and, more particularly, to a cutting device for cutting elongated strands, such as plastic tubing.

2. Description of the Prior Art

The use of plastic tubing in machine construction, building construction, and the like as fluid conduits has become more and more prevalent in recent years. Plastic tubing has enjoyed this increasing acceptance and use primarily due to its flexibility and low cost.

Plastic tubing is available in a plurality of standard diameter sizes. In addition, plastic tubing is commonly sold and commercially available in coiled rolls.

In order to cut the desired length of plastic tubing from the coiled roll, it has been the previous practice for workmen to cut the tubing with a pen knife or razor knife. This practice, however, is disadvantageous in several different aspects.

One disadvantage of this previously-known practice is that workmen typically cut the plastic tubing against their thumb or hand. Consequently, when excessive pressure is used, the workman cuts into his thumb or hand with the knife.

In many applications for plastic tubing, a cut through the tubing perpendicular to its axis of elongation is desirable and even may be required. However, such a cut is difficult, if not impossible, to obtain when cutting the tubing with a pen knife or the like.

Instead of a pen knife or razor knife, some workmen use scissors or wire cutters to cut plastic tubing. Both scissors and wire cutters, however, tend to crush the plastic tubing during cutting and thus weaken or destroy the plastic tubing.

SUMMARY OF THE PRESENT INVENTION

The tool of the present invention overcomes these abovementioned disadvantages by providing a simple and inexpensive tool particularly adapted for cutting plastic tubing or the like.

In brief, the tool of the present invention comprises a first and second elongated handle member. The handle members are pivotally secured together at one end so that the handle members are movable between an open and closed position relative to each other.

At least one clamping surface is provided along the inner periphery of each elongated handle member near its pivotally connected end. The clamping surfaces on the first and second handle members face each other and conform to the outer periphery of the plastic tubing to be cut. Thus, with the plastic tubing positioned between the handle members the handle members are moved to their closed position whereupon the clamping surfaces contact and clampingly engage the outer periphery of the plastic tubing. Preferably, a plurality of different sized clamping surfaces are formed on each handle member for accommodating plastic tubing of accordingly different diameters.

A cutting blade is pivotally secured to one of the handle members so that while pivoting, the cutting blade passes across the clamping surfaces formed on the handle members. Thus, with a length of plastic tubing clampingly retained between the handle members, the cutting blade, while pivoting, contacts and cuts the plastic tubing substantially perpendicular to its axis of elongation.

As will hereinafter become more clearly apparent, the cutting tool of the present invention is of simple and relatively inexpensive construction, but is highly efficient in operation. In addition, the cutting tool of the present invention is completely safe in use thereby eliminating the previously known injuries associated with cutting plastic tubing with pen knives, razor knives, or the like. Moreover, since the outer periphery of the tubing is supported by the clamping surfaces during the cutting operation, the previously known collapse of the tubing is prevented.

BRIEF DESCRIPTION OF THE DRAWINGS

A better understanding of the present invention will be had upon reference to the following detailed description when read in conjunction with the accompanying drawing wherein like reference characters refer to like parts throughout the several views, and in which.

DETAILED DESCRIPTION OF THE PRESENT INVENTION

Figure 2:
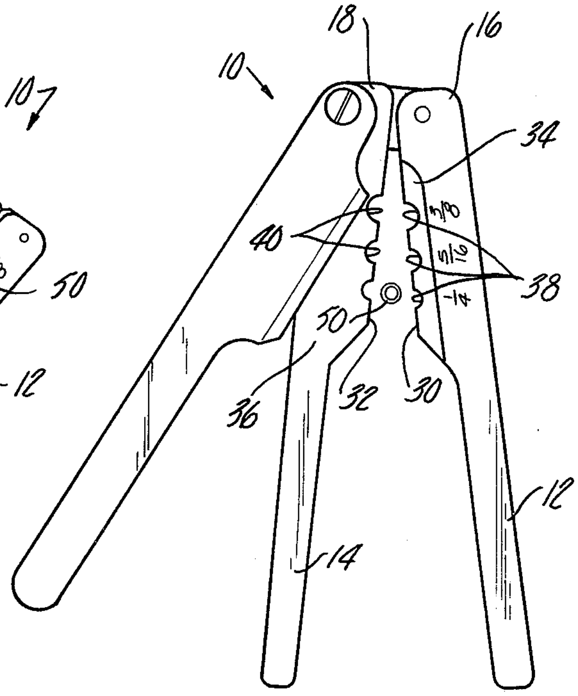
FIG. 2 is a top plan view of the cutting tool of the present invention and showing the handle members in a first position.
Figure 3:
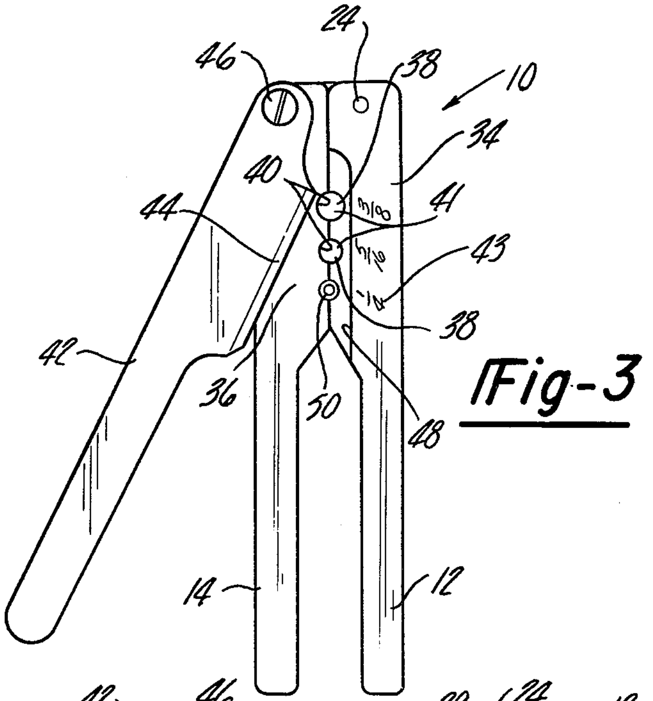
FIG. 3 is a top plan view of a cutting device of the present invention similar to FIG. 2, but showing the handle members in a closed position.
Figure 5:
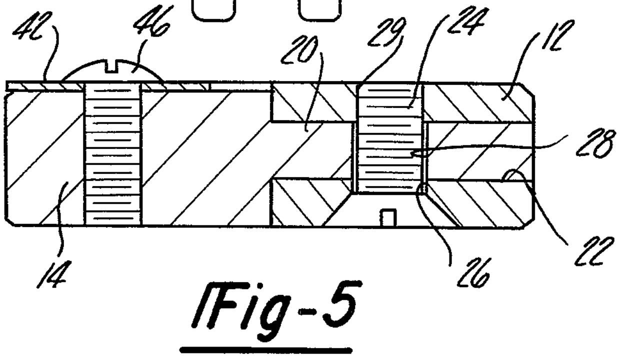
FIG. 5 is a sectional view of the cutting tool of the present invention taken substantially along line 5—5 in FIG. 4 and enlarged for clarity.

With reference first to FIGS. 2, 3, and 5, the cutting tool 10 of the present invention is thereshown and comprises a first elongated handle member 12 and a second elongated handle member 14. A first end 16 of the handle member 12 is pivotally connected to a first end 18 of the handle member 14 so that the handle members 12 and 14 are movable between an open position illustrated in FIG. 2 and a closed position illustrated in FIG. 3. Although any appropriate means may be used to pivotally couple the ends 16 and 18 of the handle members 12 and 14, respectively, together, preferably the handle member 14 includes a laterally extending tongue 20 which is slidably received in an axial slot 22 formed in the end 16 of the handle member 12. A screw 24 extends through registering apertures 26 and 28 in the handle members 12 and 14 and threadably engages an aperture 29 in the member 12 to pivotally secure the handle members 12 and 14 together.

With reference now to FIGS. 2 and 3, with the handle members 12 and 14 in their closed position illustrated in FIG. 3, the inside surface 30 of a portion 34 of the first handle member 12 abuts against the inside surface 32 of a portion 36 of the handle member 14. The portions 34 and 36 of the handle members 12 and 14 are adjacent their respective first ends 16 and 18.

At least one, and preferably three, semicircular channels 38 are formed along the first handle portion 34 which face like-shaped semicircular channels 40 formed on the second handle portion 36. With the handle portions 12 and 14 in their closed position illustrated in FIG. 3, the semicircular channels 30 and 40 register with each other and form substantially circular channels 41 (FIG. 3) each having its axis substantially parallel to the pivotal axis of the handle members 12 and 14. The circular channels 41 formed by the registering and facing semicircular channels 38 and 40, vary in diametric size between each other for a reason which will become hereinafter apparent. Proper indicia 43 can be imprinted on the handle member 12 to indicate the diametric size of the circular channels 41.

Figure 4:
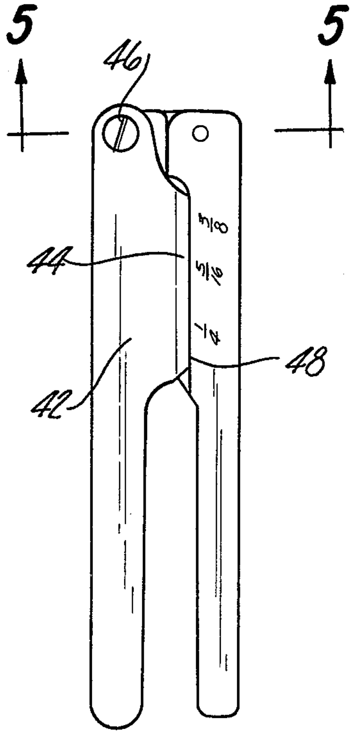
FIG. 4 is a top plan view of the cutting tool of the present invention similar to FIG. 3, but showing the cutting blade in a different pivotal position.

With reference now to FIGS. 3–5, a cutting handle 42 having a cutting blade portion 44 is pivotally secured by a screw 46 to the first end 18 and on top of the second handle member 14. The cutting handle 42 is of substantially the same length as the handle member 14 and is movable from an open position illustrated in FIG. 3 to the closed position illustrated in FIG. 4. In doing so, the cutting handle 42 flatly slides upon the upper surface of the first handle member 14.

The pivotal axis of the cutting handle 42 is substantially parallel to the pivotal axis of the handle members 12 and 14. Consequently, when the cutting handle 42 is moved from its open to its closed position, the cutting blade portion 44 passes substantially perpendicularly across one axial end of the circular channels 41. A raised ridge 48 on the first handle member portion 34 abuts against the cutting blade 44 to limit the innermost position of the cutting handle 42.

Figure 1:
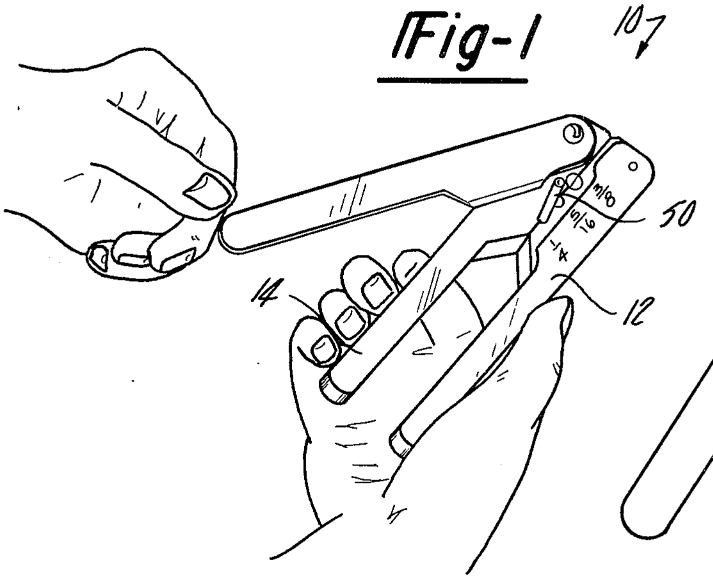
FIG. 1 is a perspective view showing the cutting tool of the present invention.

The operation of the cutting tool 10 will now be described by way of example. With the handle members 12 and 14 in their open position illustrated in FIG. 2, a length of plastic tubing 50 or the like is positioned between the semicircular channels 38 and 40 on the handle member portions 34 and 36 so that the desired length of tubing 50 extends above the tool 10, as illustrated in FIG. 1. In addition, the plastic tubing 50 is positioned between the appropriate semicircular channels 38 and 40 which correspond to the particular diameter of the tubing 50.

The handle members 12 and 14 are then moved to their closed position, illustrated in FIG. 3, so that the tubing 50 is clampingly held between the handle members 12 and 14 and with the cutting handle 42 pivoted away from the channels 41.

Thereafter the cutting handle 42 is moved to its inner position shown in FIG. 4 so that the cutting blade portion 44 contacts and severs the tubing 50 as the blade portion 44 passes across the channels 41. Since the tubing 50 is supported around its outer periphery by the handle member portions 34 and 36, the collapse or crushing of the tubing 50 during the cutting operation is prevented. The subsequent opening of the handle members 12 and 14 will release the section of tubing entrapped between the handle portions 34 and 36.

It can, thus, be seen that the cutting tool 10 of the present invention provides a simple, inexpensive and yet efficient cutting tool which is particularly adapted for cutting plastic tubing. Moreover, a substantially perpendicular cut can be repeatedly obtained by using the tool 10 of the present invention.

While the tool 10 has been described for use as a plastic tube cutter, it will be understood, of course, that the tool 10 can be used to cut virtually any type of strand, regardless of its material. Where a different type of strand is to be cut, of course, the channels 38 and 40 would be modified to conform to the outer periphery of the particular strand.

Having described my invention, many modifications thereto will become apparent to those skilled in the art to which it pertains without departing from the spirit of the invention as defined by the scope of the appended claims.

I claim:

1. A device for cutting cylindrical plastic tubing comprising:

a first elongated handle member;

a second elongated handle member;

means for pivotally securing one end of said first handle member to one end of said second handle member so that said handle members are movable between an open and closed position;

jaw means formed on each of said handle members for clampingly engaging said tubing of different and predetermined outside diameters when said handle members are in said closed position wherein said jaw means comprises a plurality of semicircular channels formed on each handle member, each channel on each handle member having a different radius and being spaced along said handle members so that upon closure of the handle members, said channels of a like radius on opposite handle members register with and face each other so that with tubing positioned between channels having a radius equal to one half the diameter of the last mentioned tubing said last mentioned channels clampingly engage and support substantially the entire outer periphery of said tubing when said handle members are in said closed position; and a cutting blade pivotally secured to said first handle member and adapted to move from an outer pivotal position, across said jaw means generally perpendicular to longitudinal axis of said channels and to an inner pivotal position to thereby cut said tubing.

2. The invention as defined in claim 1 wherein said jaw means is disposed on said handle members between said pivotally securing means and the other ends of said handle members.

3. The invention as defined in claim 1 and including means for limiting the innermost pivotal position of said cutting blade.

4. The invention as defined in claim 3 wherein said limiting means comprises a raised ridge formed on said second handle member which abuttingly receives said cutting blade at its innermost pivotal position.

5. The invention as defined in claim 1 wherein said cutting blade is pivotally secured to said one end of said first handle member.

* * * * *